(12) United States Patent
Tomioka (10) Patent No.: US 8,841,616 B2
(45) Date of Patent: Sep. 23, 2014

(54) TERAHERTZ WAVE DETECTING DEVICE, IMAGING DEVICE, AND MEASURING DEVICE

(71) Applicant: Seiko Epson Corporation, Tokyo (JP)

(72) Inventor: Hiroto Tomioka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 179 days.

(21) Appl. No.: 13/656,809

(22) Filed: Oct. 22, 2012

(65) Prior Publication Data

US 2013/0099118 A1    Apr. 25, 2013

(30) Foreign Application Priority Data

Oct. 24, 2011 (JP) ................. 2011-232556

(51) Int. Cl.
*H01L 25/00* (2006.01)
*G01J 5/08* (2006.01)
*G01J 3/42* (2006.01)
*G01J 3/12* (2006.01)

(52) U.S. Cl.
CPC ............ *G01J 5/0862* (2013.01); *G01J 5/0853* (2013.01); *G01J 3/42* (2013.01); *G01J 2003/1213* (2013.01)
USPC ........................................ 250/332

(58) Field of Classification Search
CPC ... G01J 2003/1213; G01J 3/42; G01J 5/0853; G01J 5/0862

USPC .................... 250/332, 341.1–341.8
See application file for complete search history.

(56) References Cited

U.S. PATENT DOCUMENTS

| 7,638,769 | B2 * | 12/2009 | Honda et al. | 250/338.4 |
| 8,354,642 | B2 * | 1/2013 | Berger et al. | 250/338.4 |
| 2005/0082480 | A1 * | 4/2005 | Wagner et al. | 250/338.1 |
| 2007/0023661 | A1 * | 2/2007 | Wagner et al. | 250/338.1 |
| 2009/0303624 | A1 * | 12/2009 | Fujii et al. | 359/839 |
| 2012/0261575 | A1 * | 10/2012 | Averitt et al. | 250/332 |

FOREIGN PATENT DOCUMENTS

WO    WO-2008-075624 A1    6/2008

* cited by examiner

*Primary Examiner* — Kiho Kim
(74) *Attorney, Agent, or Firm* — Global IP Counselors, LLP (57) ABSTRACT

A terahertz wave detecting device includes a wavelength filter and a detection part. The wavelength filter is configured to convert terahertz waves to heat. The detection part is configured to detect the heat converted by the wavelength filter. The wavelength filter includes a wavelength selection layer and a terahertz wave absorption layer. The wavelength selection layer is configured to transmit terahertz waves of a prescribed wavelength among the terahertz waves. The terahertz wave absorption layer is provided in contact with the wavelength selection layer and the detection part, and contains a material for absorbing the terahertz waves of the prescribed wavelength.

20 Claims, 6 Drawing Sheets

TERAHERTZ WAVE DETECTING DEVICE, IMAGING DEVICE, AND MEASURING DEVICE

CROSS-REFERENCE TO RELATED APPLICATIONS

This application claims priority to Japanese Patent Application No. 2011-232556 filed on Oct. 24, 2011. The entire disclosure of Japanese Patent Application No. 2011-232556 is hereby incorporated herein by reference.

BACKGROUND

1. Technical Field

The present invention relates to a terahertz wave detecting device, imaging device, and measuring device.

2. Related Art

In recent years, attention has been devoted to terahertz waves, which are electromagnetic waves with frequencies of 100 GHz or greater and 30 THz or less. Terahertz waves can be used in various forms of measurement and non-destructive testing such as imaging and spectrometry. Terahertz wave detectors for detecting terahertz waves include pyroelectric sensors, bolometers and the like. Major features of these include high sensitivity to terahertz waves and not requiring optical delay mechanisms that are large and cumbersome such as a THz-TDS (Time Domain Spectrometry) spectroscopic analysis device.

When using a pyroelectric sensor or bolometer for the THz-TDS spectroscopic analysis device, both the pyroelectric sensor and bolometer detect the existence of terahertz waves by changes in the heat volume within the components. Because of that, detection of the terahertz wave frequency spectrum is impossible, and to perform spectrum detection, it is necessary to have a wavelength filter that selectively transmits terahertz waves of the prescribed wavelengths one wishes to detect.

Currently, a wavelength filter has been proposed that transmits terahertz waves of prescribed wavelengths (see International Application Publication No. WO2008/075624, for example). This wavelength filter is constituted by a substrate and a metal film provided on the substrate which has a plurality of pores. By combining this wavelength filter and a pyroelectric sensor or bolometer, it is possible to detect only terahertz waves of prescribed wavelengths.

SUMMARY

However, with the prior art wavelength filter, when designing for the terahertz wave wavelength band, by having the pitch of the plurality of pores be 100 μm or greater, the surface area of the wavelength filter becomes several cm or greater. There was the disadvantage that integration to a single unit with the pyroelectric sensor or bolometer was difficult, and it was difficult to realize a terahertz wave detector that was able to detect multiple wavelengths. In light of that, there has been demand for a terahertz wave detecting device, image device, and measuring device which can be made more compact.

The present invention was created to address at least part of the problems described above, and can be realized as the following modes or aspects.

A terahertz wave detecting device according to one aspect of the present invention includes a wavelength filter and a detection part. The wavelength filter is configured to convert terahertz waves to heat. The detection part is configured to detect the heat converted by the wavelength filter. The wavelength filter includes a wavelength selection layer and a terahertz wave absorption layer. The wavelength selection layer is configured to transmit terahertz waves of a prescribed wavelength among the terahertz waves. The terahertz wave absorption layer is provided in contact with the wavelength selection layer and the detection part, and contains a material for absorbing the terahertz waves of the prescribed wavelength.

With this aspect, the wavelength filter converts terahertz waves of a prescribed wavelength to heat. Then, the detection part detects the heat converted by the wavelength filter. The wavelength filter has a wavelength selection layer that transmits terahertz waves of prescribed wavelengths, and a terahertz wave absorption layer. The terahertz wave absorption layer contains a material that absorbs terahertz waves, and this material compresses and absorbs the terahertz waves. Then, the terahertz waves that are made incident on the terahertz wave absorption layer are compressed. By doing this, it is possible to make the wavelength shorter than when there is no terahertz absorption.

It is possible to design a wavelength filter for wavelengths shorter than the terahertz waves of the prescribed wavelengths transmitted through the wavelength selection unit of the wavelength filter. Therefore, because it is possible to make the surface area of the wavelength filter smaller, it is possible to make the terahertz wave detecting device for which the wavelength filter and the detection part are an integrated unit more compact.

With the terahertz wave detecting device of the aforementioned aspect, the wavelength selection layer is preferably a metal layer having a first surface on which the terahertz waves are made incident, a second surface facing opposite the first surface, and a plurality of pores that connect the first surface and the second surface, and the pores are preferably provided at a prescribed pitch along a direction perpendicular to a normal line of the first surface.

With this aspect, the wavelength selection layer is a metal layer having a plurality of pores provided at a prescribed pitch. Therefore, it is possible to transmit terahertz waves of prescribed wavelengths.

With the terahertz wave detecting device according to the aforementioned aspect, a dielectric constant of the material of the terahertz wave absorption layer is preferably 10 or greater and 500 or less.

With this aspect, the dielectric constant of the material of the terahertz wave absorption layer is 10 or greater and 500 or less. As a result, the terahertz wave absorption layer can have the wavelength of the terahertz waves propagated by the wavelength filter made smaller.

With the terahertz wave detecting device according to the aforementioned aspect, a sheet resistance of the material of the terahertz wave absorption layer is preferably 300Ω/square or less and 50Ω/square or greater, and a film thickness of the terahertz wave absorption layer is preferably 1 nm or greater and 500 nm or less.

With this aspect, the sheet resistance of the material of the terahertz wave absorption layer is 300Ω/square or less and 50Ω/square or greater. At this time, the sheet resistance can have a higher absorption rate in relation to the terahertz waves compared to when it is 300Ω/square or greater or 50Ω/square or less. Also, the film thickness of the terahertz wave absorption layer is 1 nm or greater and 500 nm or less. At this time, it is possible to transmit heat energy to the detection part efficiently. As a result, the terahertz wave absorption layer reliably absorbs terahertz waves and converts them to heat, and is able to transmit the converted energy to the detection part.

With the terahertz wave detecting device according to the aforementioned aspect, the terahertz wave absorption layer is preferably made of a metal alloy material.

With this aspect, the terahertz wave absorption layer is a metal alloy material. Therefore, it is possible for the terahertz wave absorption layer to reliably absorb terahertz waves and convert them to heat, and to reliably transmit that energy to the detection part.

With the terahertz wave detecting device according to the aforementioned aspect, the terahertz wave absorption layer is preferably made of a silicon compound.

With this aspect, the terahertz wave absorption layer is a silicon compound. Therefore, it is possible for the terahertz wave absorption layer to reliably absorb terahertz waves and convert them to heat, and to reliably transmit that energy to the detection part.

With the terahertz wave detecting device according to the aforementioned aspect, the terahertz wave absorption layer is preferably made of a nitrogen compound.

With this aspect, the terahertz wave absorption layer is a nitrogen compound. Therefore, it is possible for the terahertz wave absorption layer to reliably absorb terahertz waves and convert them to heat, and to reliably transmit that energy to the detection part.

With the terahertz wave detecting device according to the aforementioned aspect, a shape of each of the pores in a plan view as seen along the normal line of the first surface is preferably a circle, and the pores are preferably provided so as to satisfy $0.25 \leq d/s < 1$, when a diameter of the circle is d, and a distance between centers of the circles of adjacent ones of the pores in the plan view is s.

With this aspect, the pore conditions satisfy equation $0.25 \leq d/s < 1$. Specifically, when d/s is smaller than 0.25, depending on the other conditions, it is not possible for terahertz waves to transmit through the metal layer. Also, when d/s is 1 or greater, two of the adjacent pores end up in contact or in communication. Therefore, since the pores satisfy the conditions of equation $0.25 \leq d/s < 1$, it is possible to detect terahertz waves of prescribed wavelengths with good precision.

With the terahertz wave detecting device according to the aforementioned aspect, a thickness of the wavelength selection layer along the normal line of the first surface is preferably equal to or less than the prescribed wavelength.

With this aspect, the thickness along the normal line direction of the wavelength selection layer is a prescribed wavelength or less. Therefore, it is possible to prevent transmission of terahertz waves of wavelengths of a prescribed wavelength or greater through the wavelength selection layer. As a result, it is possible to detect terahertz waves of prescribed wavelengths with good precision.

With the terahertz wave detecting device according to the aforementioned aspect, the prescribed pitch of two adjacent ones of the pores is preferably the same length as the prescribed wavelength.

With this aspect, standing waves of terahertz waves of wavelengths the same length as the prescribed pitch of the pores occur on the metal layer surface, and terahertz waves of prescribed wavelengths are transmitted through the wavelength filter. As a result, it is possible to detect terahertz waves of prescribed wavelengths with good precision.

With the terahertz wave detecting device according to the aforementioned aspect, the wavelength filter preferably includes a first region in which the pores of the wavelength selection layer are provided at a first pitch along the direction perpendicular to the normal line of the first surface, and a second region in which the pores of the wavelength selection layer are provided at a second pitch along the direction perpendicular to the normal line of the first surface.

With this aspect, the pore pitch is different between the first region and the second region. Therefore, the prescribed wavelengths of the terahertz waves converted to heat are different in the first region and the second region. As a result, it is possible to detect terahertz waves of a plurality of prescribed wavelengths with good precision.

With the terahertz wave detecting device according to the aforementioned aspect, the wavelength filter preferably has a plurality of unit regions, and each of the unit regions preferably has a first region in which the pores of the wavelength selection layer are provided at a first pitch along the direction perpendicular to the normal line of the first surface, and a second region in which the pores of the wavelength selection layer are provided at a second pitch along the direction perpendicular to the normal line of the first surface.

With this aspect, the wavelength filter has a plurality of unit regions. Also, the pore pitch is different for the first region and second region in each unit region. Therefore, the prescribed wavelength of the terahertz waves converted to heat are different between the first region and second region. As a result, it is possible to detect terahertz waves of a plurality of prescribed wavelengths for each unit area with good precision.

With the terahertz wave detecting device according to the aforementioned aspect, the detection part preferably has a plurality of unit detection parts provided respectively corresponding to the first region and the second region of the wavelength filter, and configured to detect the heat made by conversion of the terahertz waves transmitted through the wavelength selection layer in the first region and the second region.

With this aspect, detection parts are respectively provided corresponding to the first region and second region of the wavelength filter. Because the pore pitch is different for the first region and the second region, the prescribed wavelengths of the terahertz waves converted to heat are different in the first region and the second region. Therefore, the prescribed wavelength of the terahertz waves transmitted as energy to the unit detection part is also different for the first region and the second region. As a result, it is possible to detect terahertz waves of a plurality of prescribed wavelengths.

An imaging device according to another aspect of the present invention includes a terahertz wave generating device, a terahertz wave detecting device, and an image generating unit. The terahertz wave generating device is configured to generate terahertz waves. The terahertz wave detecting device is configured to detect the terahertz waves that were emitted from the terahertz wave generating device and transmitted through an object or reflected by the object. The image generating unit is configured to generate an image of the object based on detection results of the terahertz wave detecting device. The terahertz wave detecting device includes a wavelength filter configured to convert the terahertz waves that were transmitted through the object or reflected by the object to heat, and a detection part configured to detect the heat converted by the wavelength filter. The wavelength filter of the terahertz wave detecting device includes a wavelength selection layer configured to transmit terahertz waves of a prescribed wavelength among the terahertz waves that were transmitted through the object or reflected by the object, and a terahertz wave absorption layer provided in contact with the wavelength selection layer and the detection part, and containing a material for absorbing the terahertz waves of the prescribed wavelength.

With this aspect, the terahertz wave generating device generates terahertz waves, and emits them on an object. Also, the terahertz wave detecting device detects terahertz waves transmitted through the object or reflected by the object and outputs the detection results. Next, the image generating unit generates images of the object using the detection results of the terahertz wave detecting device.

The terahertz wave detecting device is equipped with a wavelength filter and a detection part. The wavelength filter is equipped with a wavelength selection layer and a terahertz wave absorption layer. The wavelength selection layer transmits terahertz waves of prescribed wavelengths. The terahertz wave absorption layer contains a material that absorbs terahertz waves, and this absorbs terahertz waves of prescribed wavelengths transmitted through the wavelength selection layer and converts them to heat. As a result, the detection part detects terahertz waves of prescribed wavelengths converted to heat. Also, the image generating unit generates an image of the object based on the detection results of the terahertz wave detecting device.

With the wavelength filter, the terahertz waves are made incident on the terahertz wave absorption layer from the wavelength selection layer, and the wavelength becomes shorter than when there is no terahertz absorption. Therefore, it is possible to make terahertz wave wavelength filters more compact than with the prior art. As a result, it is possible to make the imaging device compact.

A measuring device according to another aspect of the present invention includes a terahertz wave generating device, a terahertz wave detecting device, and a measuring unit. The terahertz wave generating device is configured to generating terahertz waves. The terahertz wave detecting device is configured to detect the terahertz waves that were emitted from the terahertz wave generating device and transmitted through an object or reflected by the object. The measuring unit is configured to measure the object based on detection results of the terahertz wave detecting device. The terahertz wave detecting device includes a wavelength filter configured to convert the terahertz waves that were transmitted through the object or reflected by the object to heat, and a detection part configured to detect the heat converted by the wavelength filter. The wavelength filter of the terahertz wave detecting device includes a wavelength selection layer configured to transmit terahertz waves of a prescribed wavelength among the terahertz waves that were transmitted through the object or reflected by the object, and a terahertz wave absorption layer provided in contact with the wavelength selection layer and the detection part, and containing a material for absorbing the terahertz waves of the prescribed wavelength.

With this aspect, the terahertz wave generating device generates terahertz waves, and emits them on an object. Also, the terahertz wave detecting device detects the terahertz waves that were transmitted through the object or which were reflected by the object, and outputs the detection results. Next, the measuring unit measures the object using the detection results of the terahertz wave detecting device.

The terahertz wave detecting device is equipped with a wavelength filter and detection part. The wavelength filter is equipped with a wavelength selection layer and a terahertz wave absorption layer. The wavelength selection layer transmits terahertz waves of prescribed wavelengths. The terahertz wave absorption layer contains a material that absorbs terahertz waves, and absorbs terahertz waves of prescribed wavelengths transmitted through the wavelength selection layer and converts these to heat. As a result, the detection part detects terahertz waves of the prescribed wavelength converted to heat. Then, the measuring unit measures the object based on the detection results of the terahertz wave detecting device.

With the wavelength filter, the terahertz waves made incident on the terahertz wave absorption layer from the wavelength selection layer are compressed, and the wavelength is shorter than when there is no terahertz wave absorption. Therefore, it is possible to make the terahertz wave wavelength filter more compact than with the prior art. As a result, it is possible to make the measuring device more compact.

BRIEF DESCRIPTION OF THE DRAWINGS

Referring now to the attached drawings which form a part of this original disclosure.

DETAILED DESCRIPTION OF EXEMPLARY EMBODIMENTS

Embodiments of the present invention will be described while referring to the drawings. With each drawing below, to make each layer and each member a recognizable size, the scale of the layers and the members has been modified from the actual state.

First Embodiment

Figure 1:
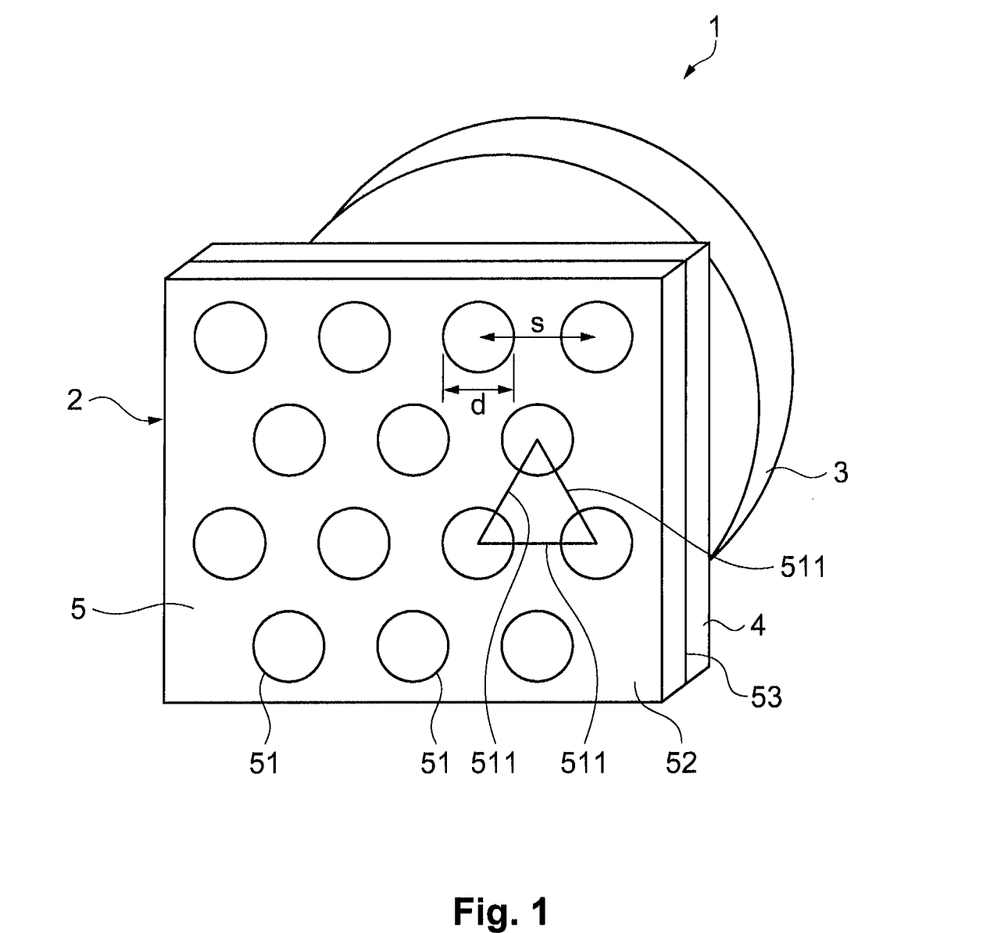
FIG. 1 is a schematic perspective view showing the constitution of the terahertz wave detecting device of the first embodiment.

FIG. 1 is a schematic perspective view showing the constitution of a terahertz wave detecting device of a first embodiment. The terahertz wave detecting device 1 shown in FIG. 1 is a device that detects prescribed frequency components of terahertz waves, specifically, terahertz waves of prescribed wavelengths. The prescribed wavelengths indicate the wavelengths for which intensity is to be detected. This terahertz wave detecting device 1 has a wavelength filter 2 for selectively converting terahertz waves of prescribed wavelengths to heat, and a detection part 3 for detecting heat converted by the wavelength filter. Also, with the terahertz wave detecting device 1, the positional relationship between the wavelength filter 2 and the detection part 3 is fixed. Therefore, for example, it is also possible to make the wavelength filter 2 and the detection part 3 into an integrated unit.

A terahertz wave means an electromagnetic wave for which the frequency is 100 GHz or greater and 30 THz or less, and particularly an electromagnetic wave of 300 GHz or greater and 3 THz or less.

The wavelength filter 2 of the terahertz wave detecting device 1 has a terahertz wave absorption layer 4 for absorbing terahertz waves, and is equipped with a metal film 5 (metal layer, wavelength selection layer) having a plurality of pores 51 (through holes). The metal film 5 has an incidence plane (first surface) 52 on which the terahertz waves are made incident, and an emission plane (second surface) 53 at which terahertz waves transmitted through the metal film 4 are emitted, and the plurality of pores 51 are provided so as to communicate and connect the incidence plane 52 and the emission plane 53. The terahertz wave absorption layer 4 is provided on the terahertz wave emission side of the metal film 5. The terahertz wave absorption layer 4 is also in contact with the detection part 3 described later.

The external shape of the metal film 5 corresponds to the external shape of the terahertz wave absorption layer 4. Also, each pore 51 formed on the metal film 5 is arranged two-dimensionally, and aligned systematically. The shape of each pore 51 is not particularly restricted, but examples include circles, ovals, polygons such as quadrangles, linear forms, curved forms, and polygonal line forms. With the constitution in the drawing, the shape of the pores 51 is a circle, and following, for the conditions of the pores 51, a representative example of a case when the shape of the pores 51 is a circle will be described.

With the pores 51, the distance between the centers of two adjacent pores 51 with a plan view from the normal line direction of the incidence plane 52 is set according to the wavelength of the terahertz waves that are transmitted through the wavelength filter 2 (hereafter also called "transmission wavelength"). Specifically, the pores 51 are provided arranged periodically at a prescribed pitch along the direction perpendicular to the normal line of the incidence plane 52. The distance between the centers of two adjacent pores 51 is set to be the same as the transmission wavelength. As a result, it is possible to transmit terahertz waves of prescribed wavelength with good precision, and using the detection part 3, it is possible to detect the terahertz waves of prescribed wavelengths with good precision.

Also, with the constitution in the drawing, with the pores 51, the three straight lines 511 that connect the centers of two adjacent pores 51 to each other form an equilateral triangle, and each equilateral triangle is arranged so as to be aligned systematically. Specifically, the pores 51 are arranged in an equilateral triangle grid form.

Also, with the pores 51, when the diameter of the pore 51 is d and the distance between centers of two adjacent pores 51 (pore 51 pitch) is s, it is preferable that they be provided so as to satisfy equation (1) noted below.

$$0.25 \leq d/s < 1 \quad (1)$$

When d/s is smaller than 0.25, depending on other conditions, it is not possible for terahertz waves to be transmitted through the metal film 5. When d/s is 1 or greater, two adjacent pores 51 are in contact or in communication. Therefore, it is preferable that d/s be 0.25 or greater and less than 1. It is more preferable that d/s be 0.25 or greater and 0.5 or less.

Also, for the diameter d of the pore 51, the smaller it is, the better the precision, so it is preferable to set it as small as possible within a scope that fulfills equation (1).

Specifically, the diameter d of the pores 51 is preferably 0.1 μm or greater, and less than 3 mm, more preferably 1 μm or greater, and less than 300 μm, and even more preferably 10 μm or greater, and less than 30 μm. Also, the distance between centers of two adjacent pores 51 s is preferably 0.1 μm or greater and 3 mm or less, more preferably 1 μm or greater and 300 μm or less, and even more preferably 10 μm or greater and 30 μm or less.

Also, the thickness of the metal film 5 (length of the normal line direction of the incidence plane 52) is preferably the wavelength of the terahertz wave that is transmitted through the wavelength filter 2 or less. As a result, it is possible to detect terahertz waves of prescribed wavelengths with good precision.

Specifically, the thickness of the metal film 5 is preferably 3 mm or less, more preferably 1 mm or less, even more preferably 100 μm or less, and especially preferably 10 nm or greater and 100 μm or less.

Also, as the structural material of the metal film 5, providing it is a metal there is no particular restriction, and examples include aluminum, aluminum alloys, gold, gold alloys, silver, silver alloys, stainless steel and the like.

When the shape of the pore 51 is other than a circle, the length of the longest part of the pore 51 correlates to the diameter d of the equation (1). For example, when the shape of the pore 51 is an oval, the major axis correlates to diameter d, and when the shape of the pore 51 is a polygon, the longest diagonal line correlates to diameter d.

The dielectric constant of the terahertz wave absorption layer 4 is preferably 10 or greater and 500 or less. As a result, the terahertz wave absorption layer 4 can be made smaller than the wavelength of the terahertz waves that propagate the wavelength filter 2, so it is possible to make the terahertz wave detecting device more compact.

The sheet resistance of the terahertz wave absorption layer 4 is preferably 300Ω/square or less and 50Ω/square or greater, and the film thickness of the terahertz wave absorption layer 4 is preferably 1 nm or greater and 500 nm or less. As a result, the terahertz wave absorption layer 4 reliably absorbs the terahertz waves and converts them to heat, and it is possible to transmit that energy to the detection part 3.

As the material of the terahertz wave absorption layer 4, it is possible to use a metal alloy, silicon compound, or nitrogen compound. As the metal alloy, it is possible to use aluminum bronze, titanium aluminum nitride, iron chrome, nickel chrome, aluminum magnesium alloy or the like. As the silicon compound, it is possible to use aluminum silicon, molybdenum silicon, tungsten silicon, titanium silicon and the like. By using these materials for the terahertz wave absorption layer 4, it is possible to reliably absorb terahertz waves and convert them to heat, and to reliably transmit this energy to the detection part 3.

Next, the operation of the terahertz wave detecting device 1 will be described.

When terahertz waves are made incident on the metal film 5 of the wavelength filter 2 of the terahertz wave detecting device 1, terahertz waves of prescribed wavelengths are transmitted through that metal film 5. In this case, it is possible to block the majority of the terahertz waves other than those of prescribed wavelengths. Also, terahertz waves are compressed by the terahertz wave absorption layer 4 at the wavelength filter 2, their wavelength becomes shorter and they are absorbed. As a result, it is possible to make the terahertz wave detecting device more compact.

Next, the terahertz waves of prescribed wavelengths that were transmitted through the metal film 5 are converted to heat at the terahertz wave absorption layer 4. Then, with the detection part 3, the energy of the terahertz waves converted to heat is detected. The signals showing this detection result are for example sent to an external device such as a personal computer (not illustrated) that is connected to the detection part 3.

As described above, with this terahertz wave detecting device 1, at the wavelength filter 2, the terahertz waves are compressed by the terahertz wave absorption layer 4, and the wavelength becomes shorter, so this makes it possible to make the surface area of the wavelength filter 2 smaller, making it possible to make the terahertz wave detecting device more compact.

Furthermore, by making the surface area of the wavelength filter 2 smaller, when a plurality of wavelength filters 2 are provided, it is possible to make the gap between the wavelength filters 2 smaller. Specifically, it is possible to make the gap between the plurality of detection parts 3 provided corresponding to the wavelength filters 2 smaller, and possible to increase the resolution of the terahertz wave detecting device.

Second Embodiment

Next, an embodiment of the terahertz wave detecting device which embodies the present invention will be described, using the schematic perspective view showing the constitution of the terahertz wave detecting device of FIG. 2.

The difference with this embodiment compared to the first embodiment is that a plurality of regions with different distance between centers of the pores 51 are arranged in the wavelength filter. With the second embodiment, the description focuses on the differences from the first embodiment described previously, and a description of items that are the same is omitted. Also, for the same constitutions as the previously described embodiment, the same code numbers are given as the previously described embodiment, and a detailed description will be omitted.

Figure 2:
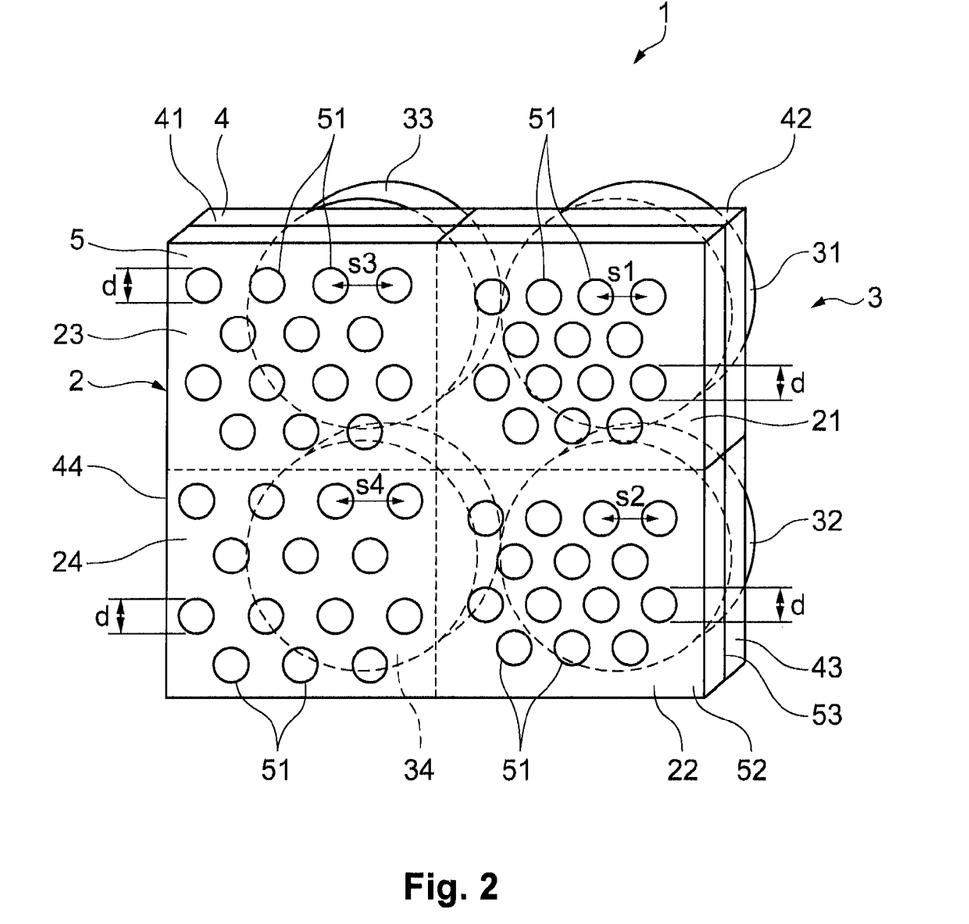
FIG. 2 is a schematic perspective view showing the constitution of the terahertz wave detecting device of the second embodiment.

As shown in FIG. 2, in the wavelength filter 2, four regions are segmented with borders shown by broken lines, into a first region 21, a second region 22, a third region 23, and a fourth region 24. With each region, the distance between centers of two adjacent pores 51 differs, and terahertz waves of mutually differing wavelengths are transmitted.

The first region 21, the second region 22, the third region 23, and the fourth region 24 have generally the same shape, specifically they are quadrangles, and have the same dimensions. The first region 21 is arranged in the upper right of FIG. 2, the second region in the lower right of FIG. 2, the third region 23 in the upper left of FIG. 2, and the fourth region 24 in the lower left of FIG. 2. The distance between centers of two adjacent pores 51 with a plan view from the normal line direction of the incidence plane 52 (pore 51 pitch) has s1 set as the first pitch with the first region 21, s2 as the second pitch with the second region 22, s3 as the third pitch with the third region 23, and s4 as the fourth pitch with the fourth region 24. Also, the relationship is s1<s2<s3<s4. As a result, the transmission wavelength is longer in sequence of the fourth region 24, the third region 23, the second region 22, and the first region 21.

Also, the terahertz wave absorption layer 4 has a wavelength filter 2, and it is preferable that the terahertz wave absorption layer 42 of the first region 21, the terahertz wave absorption layer 43 of the second region 22, the terahertz wave absorption layer 41 of the third region 23, and the terahertz wave absorption layer 44 of the fourth region 24 have the same material and the same film thickness.

The diameter of the pores 51 of the first region 21, the diameter of the pores 51 of the second region 22, the diameter of the pores 51 of the third region 23, and the diameter of the pores 51 of the fourth region 24, may be the same or different. With this embodiment, for example, they are set to be the same.

Also, the detection part 3 has a first unit detecting unit 31, a second unit detecting unit 32, a third unit detecting unit 33, and a fourth unit detecting unit 34 provided respectively corresponding to wavelength filter 2's first region 21, second region 22, third region 23, and fourth region 24. This first unit detecting unit 31, second unit detecting unit 32, third unit detecting unit 33, and fourth unit detecting unit 34 respectively convert to heat and detect terahertz waves that were transmitted through the metal layer 5 of the first region 21, the second region 22, the third region 23, and the fourth region 24. As a result, it is possible to respectively detect the terahertz waves of four desired wavelengths.

The number of regions for transmitting terahertz waves of mutually different wavelengths and the number of unit detection parts can be provided according to the number of terahertz wavelength for which detection is to be performed. The number of respective unit detection parts is not limited to being four, but for example can be two, three, or five or more. It is possible to make a larger number of detected wavelengths when the number of unit detection parts is larger.

Third Embodiment

Next, an embodiment of the terahertz wave detecting device that embodies the present invention will be described using the pattern plan view showing the constitution of the terahertz wave detecting device in FIG. 3A and the major part schematic perspective view in FIG. 3B.

The difference between this embodiment and the second embodiment is that the wavelength filters 2 of the second embodiment are arranged in grid form. With the third embodiment, the description focuses on the difference points from the second embodiment described previously, and will omit a description of the same items. Also, the same code numbers as those in the previously described embodiments are given to the same constitutions as those of the previously described embodiments, and a detailed description will be omitted.

Figure 3A:
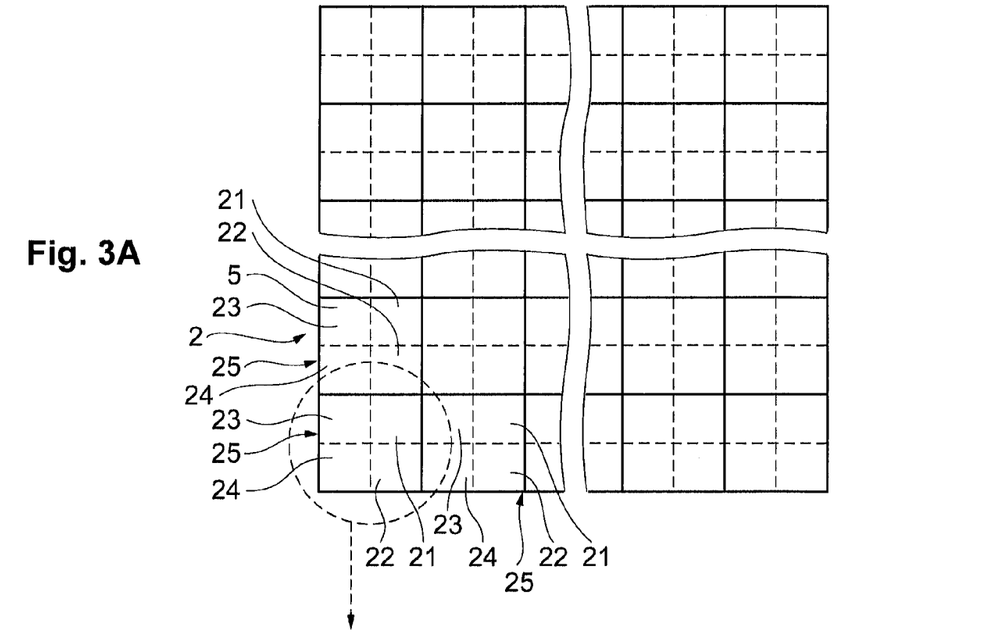
FIG. 3A is a pattern plan view showing the constitution of the terahertz wave detection device.
Figure 3B:
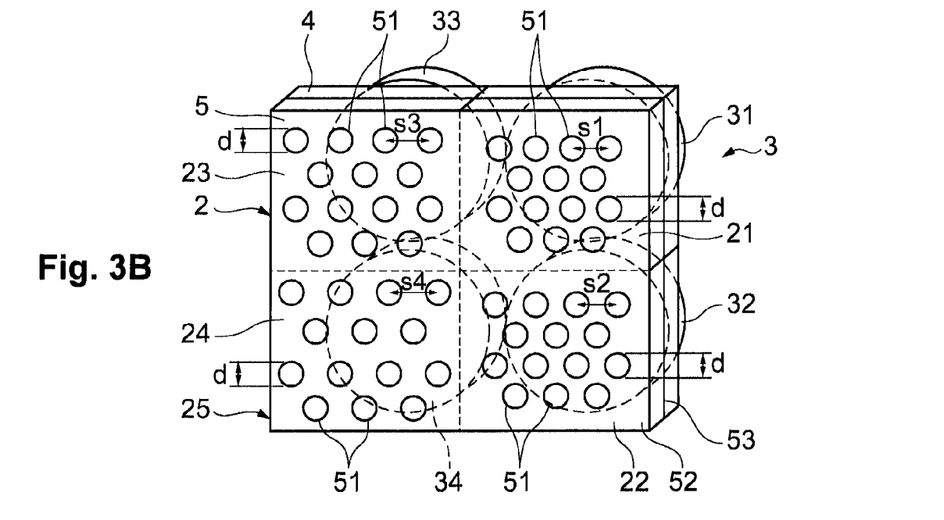
FIG. 3B is a schematic perspective view of major parts of the third embodiment.

With FIG. 3A, the boundaries of the wavelength filter 2's first region 21, second region 22, third region 23, and fourth region 24 are shown by broken lines. Also, the boundaries of the pixels 25 as two adjacent unit regions are shown by solid lines. Also, in FIG. 3B, the parts encircled by broken lines in FIG. 3A are shown enlarged. Also, with FIG. 3A, pores 51 are omitted in the illustration.

As shown in FIG. 3A, with the terahertz wave detecting device 1 of the third embodiment, the wavelength filter 2 has pixels 25 as the plurality of unit regions arranged two dimensionally. Specifically, the pixels 25 are arranged in matrix form.

Also, the pixels 25 respectively correlate to the wavelength filters 2 of the second embodiment. Specifically, each pixel 25 has a plurality of regions for which the distance between centers of two adjacent pores 51 mutually differs, and for which terahertz waves of mutually different wavelengths are transmitted, specifically a first region 21, second region 22, third region 23, and fourth region 24. The first region 21, second region 22, third region 23, and fourth region 24 are the same as those of the second embodiment, so a description of those regions is omitted.

Also, the detection part 3 has a first unit detection part 31, a second unit detection part 32, a third unit detection part 33, and a fourth unit detection part 34 provided respectively corresponding to the first region 21, the second region 22, the third region 23, and the fourth region 24 of each pixel 25 of the wavelength filter 2. Each first unit detection part 31, second unit detection part 32, third unit detection part 33, and fourth unit detection part 34 respectively converts to heat and detects terahertz waves transmitted through the metal layer 5 of the first region 21, the second region 22, the third region 23, and the fourth region 24 of each pixel 25. As a result, with each of the pixels 25, it is possible to respectively detect terahertz waves of four prescribed wavelengths.

With the wavelength filter 2 of the terahertz wave detecting device 1 of this embodiment, an item with a plurality of same unit regions containing a first region 21, second region 22, third region 23, and fourth region 24 aligned was illustrated, but it is not limited to this. For example, in each unit region, as long as a first region 21, second region 22, third region 23, and fourth region 24 are included, it is also possible to have the alignment in each region within a unit region not be the same. Also, the number of regions contained in the unit region and the number of unit detection parts does not have to be four, and is acceptable as long as it is provided according to the number of terahertz wave wavelengths to be detected. For example, this can also be two, three, or five or more.

With the present invention, the pixels 25 of the wavelength filter 2 were arranged two dimensionally on a flat plane, but can also be arranged one dimensionally or linearly.

With this embodiment, the wavelength filter 2 has a plurality of pixels 25. Also, with each pixel 25, s1 and s2 which are the pitches of the pores 51 for the first region 21 and the second region 22 for each pixel 25 are different. Therefore, the prescribed terahertz wave wavelengths of the first region 21 and the second region 22 are different. As a result, it is possible to detect the plurality of prescribed wavelength terahertz waves for each pixel 25 with good precision.

Fourth Embodiment

Figure 4:
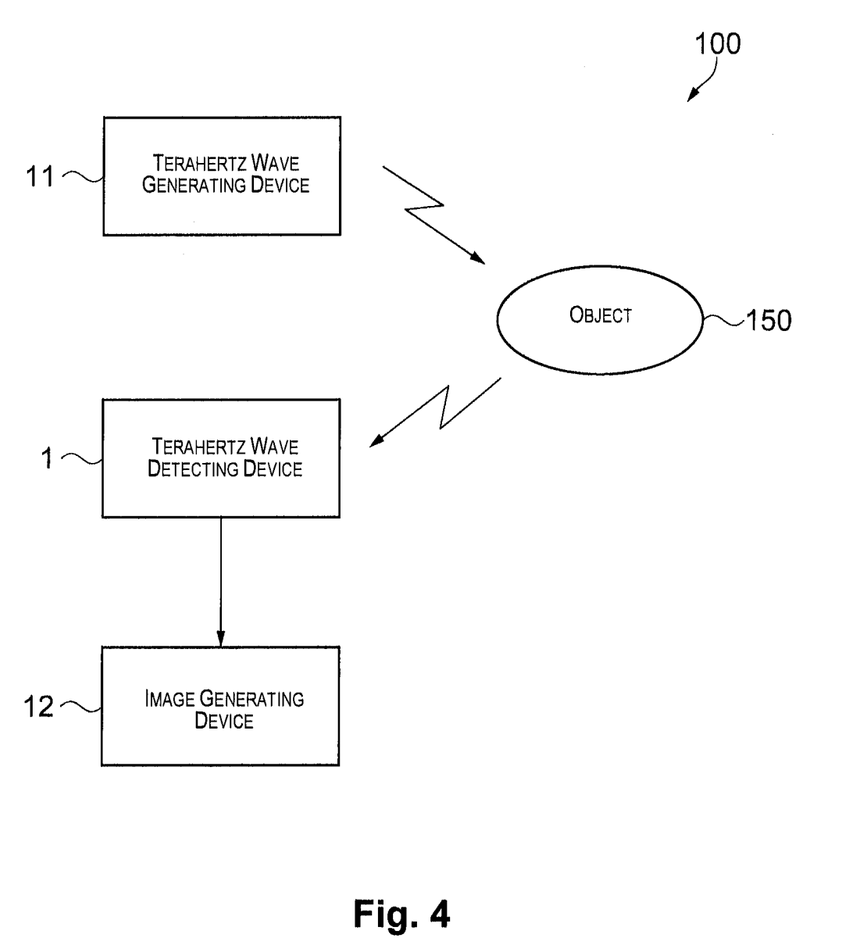
FIG. 4 is a block diagram showing the constitution of the imaging device of the fourth embodiment.

Next, an embodiment of an imaging device which uses a terahertz wave detecting device that embodies the present invention will be described while referring to FIG. 4 to FIG. 6. FIG. 4 is a block diagram showing the constitution of the imaging device.

As shown in FIG. 4, an imaging device 100 is equipped with a terahertz wave generating device 11 that generates terahertz waves. The terahertz wave generating device 11 is further equipped with a terahertz wave detecting device 1 that detects terahertz waves transmitted or reflected by the object 150 after emission of terahertz waves. The terahertz wave detecting device 1 is connected to the image generating unit 12, and the image generating unit 12 generates an image of the object 150, specifically image data, based on the detection results of the terahertz wave detecting device 1.

As the terahertz wave detecting device 1, with this embodiment, the item of the third embodiment is used. Also, the same code numbers as those of the previously described embodiments are given to the same constitutions as of the previously described embodiments, and a detailed description will be omitted.

Also, as the terahertz wave generating device 11, examples include methods using a quantum cascade laser, a photoconductive antenna, and short pulse laser, a difference frequency generation method using a non-linear optical crystal, or the like.

Next, an example of using the imaging device 100 will be described.

First, the object 150 which is the object of spectral imaging is constituted from three substances, substance A, substance B, and substance C. The imaging device 100 performs spectral imaging of this object 150. Also, here, as an example, the terahertz wave detecting device 1 detects terahertz waves which reflect on the object 150.

With each pixel 25 of the wavelength filter 2 of the terahertz wave detecting device 1, a first region 21 and a second region 22 are used. When the transmission wavelength of the first region 21 is $\lambda 1$ and the transmission wavelength of the second region 22 is $\lambda 2$, and the intensity of the wavelength $\lambda 1$ component of the terahertz wave reflected by the object 150 is $\alpha 1$ and the intensity of the transmission wavelength $\lambda 2$ component is $\alpha 2$, the transmission wavelength $\lambda 1$ of the first region 21 and the transmission wavelength $\lambda 2$ of the second region 22 are set so that the difference ($\alpha 2 - \alpha 1$) between the intensity $\alpha 2$ and intensity $\alpha 1$ can be clearly mutually distinguished for the substance A, substance B, and substance C.

Figure 5:
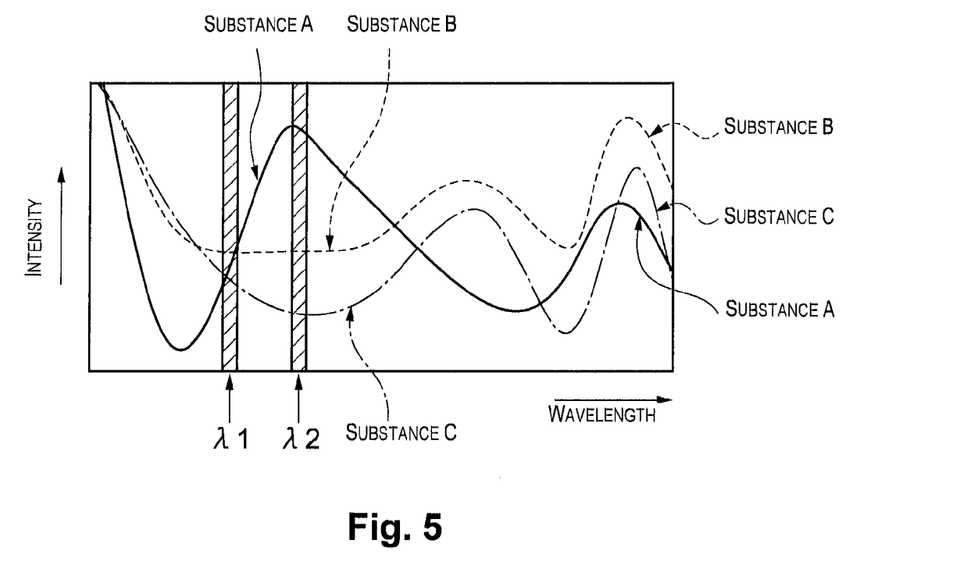
FIG. 5 is a graph showing the spectrum of the terahertz band of the object.

FIG. 5 is a graph showing the spectrum of the terahertz band of the object. The intensity of the wavelength $\lambda 2$ component reflected by the object 150 is $\alpha 2$ and the intensity of the wavelength $\lambda 1$ component is $\alpha 1$. As shown in FIG. 5, with substance A, the intensity $\alpha 1$ is smaller than the intensity $\alpha 2$, so the difference ($\alpha 2 - \alpha 1$) is a positive value. With substance B, the intensity $\alpha 2$ is roughly the same as intensity $\alpha 1$, so the difference ($\alpha 2 - \alpha 1$) is zero. With substance C, the intensity $\alpha 2$ is greater than the intensity $\alpha 1$, so the difference ($\alpha 2 - \alpha 1$) is a negative value.

With the imaging device 100, when performing spectral imaging of the object 150, first, terahertz waves are generated by the terahertz wave generating device 11, and those terahertz waves are irradiated on the object 150. Then, the terahertz wave detecting device 1 detects the terahertz waves reflected by the object 150 as the intensity $\alpha 1$ and the intensity $\alpha 2$. These detection results are sent to the image generating unit 12. The detection of irradiation of terahertz waves on the object 150 and terahertz waves reflected by the object 150 is performed for the overall object 150.

The image generating unit 12 finds the difference ($\alpha 2 - \alpha 1$) based on the detection results of the terahertz wave detecting device 1. In other words, the intensity $\alpha 2$ of the wavelength $\lambda 2$ component of the terahertz waves transmitted through the second region 22 of the wavelength filter 2 is input. Furthermore the intensity $\alpha 1$ of the wavelength $\lambda 1$ component of the terahertz waves transmitted through the first region 21 is input. Next, the image generating unit 12 finds the difference ($\alpha 2 - \alpha 1$). Also, of the object 150, sites for which the difference is a positive value are determined and specified as being substance A, sites for which the difference ($\alpha 2 - \alpha 1$) is zero as substance B, and sites for which the difference is a negative value as substance C.

Figure 6:
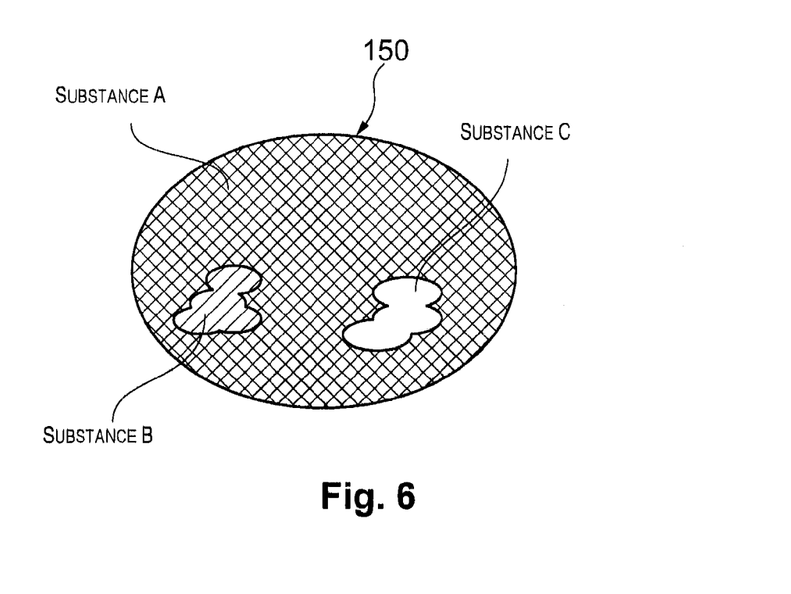
FIG. 6 is a pattern diagram for describing the image data calculated by the image generating unit.

FIG. 6 is a pattern diagram for describing the image data calculated by the image generating unit. As shown in FIG. 6, the image generating unit 12 creates image data of an image showing the distribution of the substances A, B and C of the object 150. This image data is sent to a monitor (not illustrated) from the image generating unit 12. Also, an image showing the distribution of the substance A, substance B, and substance C of the object 150 is displayed on the monitor. At this time, for example, color coded display is done so that the region in which substance A of the object 150 is distributed is shown as black, the region in which substance B is distributed is shown as gray, and the region in which substance C is distributed is shown as white. With this imaging device 100, as described above, it is possible to identify each substance constituting the object 150 and to simultaneously perform distribution measurement of each substance.

The application of the imaging device 100 is not limited to the item described above, and for example, it is possible to irradiate terahertz waves on a person, to detect terahertz waves transmitted or reflected by that person, and by performing processing at the image generating unit 12, it is possible to determine whether that person is holding a gun, knife, illegal drugs or the like.

With this embodiment, with the wavelength filter 2, the terahertz waves made incident on the terahertz wave absorption layer 4 from the metal film 5 are compressed, and the wavelength becomes shorter than when there is no terahertz absorption. Therefore, it is possible to make the terahertz wave wavelength filter 2 more compact than with the prior art. As a result, it is possible to make the imaging device 100 more compact.

Fifth Embodiment

Figure 7:
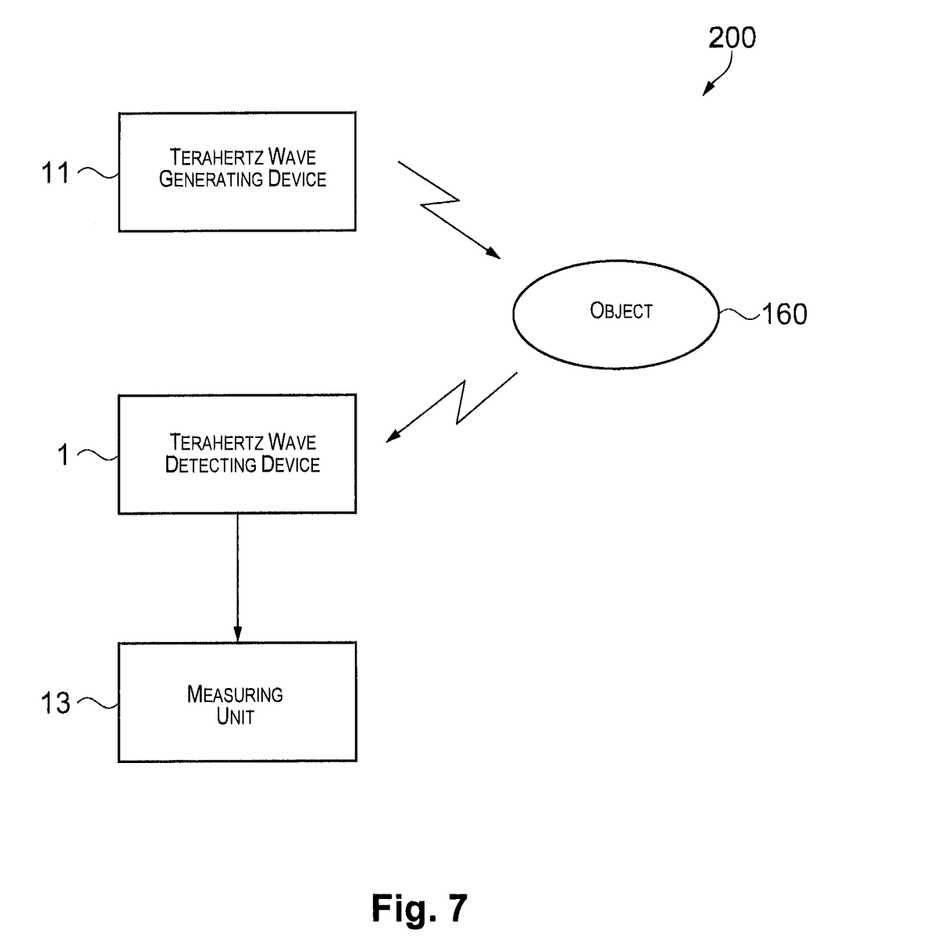
FIG. 7 is a block diagram showing the constitution of the measuring device of the fifth embodiment.

Next, an embodiment of a measuring device using a terahertz wave detecting device that embodies the present invention will be described while referring to FIG. 7. FIG. 7 is a block diagram showing the constitution of the measuring device. Following, a description of the embodiment of the measuring device focusing on the differences from the previously described imaging device embodiments will be given, and a description will be omitted for items that are the same.

As shown in FIG. 7, the measuring device 200 is equipped with a terahertz wave generating device 11 that generates terahertz waves. Also, the terahertz wave generating device 11 emits terahertz waves on the object 160. Furthermore, the measuring device 200 is equipped with a terahertz wave detecting device 1 for detecting terahertz waves transmitted or reflected by the object 160. The terahertz wave detecting device 1 is connected to the measuring unit 13, and the measuring unit 13 measures the object 160 based on the detection results of the terahertz wave detecting device 1.

As the terahertz wave detecting device 1, with this embodiment, the item in the third embodiment is used. Constitutions that are the same as those of the previously described embodiments are given the same code numbers, and a detailed description is omitted.

As the terahertz wave generating device 11, examples include methods using a quantum cascade laser, a photoconductive antenna, and short pulse laser, a difference frequency generation method using a non-linear optical crystal, or the like.

Next, a usage example of the measuring device 200 will be described.

The measuring device 200 is able to perform spectroscopic measurement of the object 160. First, the terahertz wave generating device 11 generates terahertz waves, and irradiates those terahertz waves on the object 160. Then, the terahertz waves transmitted or reflected by the object 160 are detected by the terahertz wave detecting device 1. The terahertz wave detecting device 1 sends the detection results to the measuring unit 13. Irradiation of terahertz waves on this object 160 is performed on the overall object 160. Then, detection of terahertz waves transmitted or reflected by the object 160 is also performed for the overall object 160.

The measuring unit 13 inputs the detection results, and finds out the respective intensities of the terahertz waves that are transmitted through the wavelength filter 2's first region 21, second region 22, third region 23, and fourth region 24. Next, the measuring unit 13 performs analysis of the object 160 components and their distribution and the like.

With this embodiment, with the wavelength filter 2, the terahertz waves made incident on the terahertz wave absorption layer 4 from the metal film 5 are compressed, and the wavelength becomes shorter than when there is no terahertz absorption. Therefore, it is possible to make the terahertz wave wavelength filter 2 more compact than with the prior art. As a result, it is possible to make the measuring device 200 more compact.

Above, the terahertz wave detecting device, the imaging device, and the measuring device of the present invention were described based on the embodiments in the drawings, but the present invention is not limited to these, and the constitution of each part can be substituted with an item of any constitution having the same functions. Also, any other constitutional materials or processes may be added to the present invention.

Also, with the present invention, of the embodiments noted above, it is also possible to combine any two or more constitutions (features).

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A terahertz wave detecting device comprising:
    a wavelength filter configured to convert terahertz waves to heat; and
    a detection part configured to detect the heat converted by the wavelength filter,
    the wavelength filter including
        a wavelength selection layer configured to transmit terahertz waves of a prescribed wavelength among the terahertz waves, and
        a terahertz wave absorption layer provided in contact with the wavelength selection layer and the detection part, and containing a material for absorbing the terahertz waves of the prescribed wavelength.

2. The terahertz wave detecting device according to claim 1, wherein
    the wavelength selection layer is a metal layer having a first surface on which the terahertz waves are made incident, a second surface facing opposite the first surface, and a plurality of pores that connect the first surface and the second surface, and
    the pores are provided at a prescribed pitch along a direction perpendicular to a normal line of the first surface.

3. The terahertz wave detecting device according to claim 2, wherein
    a shape of each of the pores in a plan view as seen along the normal line of the first surface is a circle, and the pores are provided so as to satisfy 0.25≤d/s<1, when a diameter of the circle is d, and a distance between centers of the circles of adjacent ones of the pores in the plan view is s.

4. The terahertz wave detecting device according to claim 3, wherein
the prescribed pitch of two adjacent ones of the pores is the same length as the prescribed wavelength.

5. The terahertz wave detecting device according to claim 2, wherein
a thickness of the wavelength selection layer along the normal line of the first surface is equal to or less than the prescribed wavelength.

6. The terahertz wave detecting device according to claim 2, wherein
the wavelength filter includes
a first region in which the pores of the wavelength selection layer are provided at a first pitch along the direction perpendicular to the normal line of the first surface, and
a second region in which the pores of the wavelength selection layer are provided at a second pitch along the direction perpendicular to the normal line of the first surface.

7. The terahertz wave detecting device according to claim 6, wherein
the detection part has a plurality of unit detection parts provided respectively corresponding to the first region and the second region of the wavelength filter, and configured to detect the heat made by conversion of the terahertz waves transmitted through the wavelength selection layer in the first region and the second region.

8. The terahertz wave detecting device according to claim 2, wherein
the wavelength filter has a plurality of unit regions, and each of the unit regions has
a first region in which the pores of the wavelength selection layer are provided at a first pitch along the direction perpendicular to the normal line of the first surface, and
a second region in which the pores of the wavelength selection layer are provided at a second pitch along the direction perpendicular to the normal line of the first surface.

9. The terahertz wave detecting device according to claim 8, wherein
the detection part has a plurality of unit detection parts provided respectively corresponding to the first region and the second region of the wavelength filter, and configured to detect the heat made by conversion of the terahertz waves transmitted through the wavelength selection layer in the first region and the second region.

10. The terahertz wave detecting device according to claim 1, wherein
a dielectric constant of the material of the terahertz wave absorption layer is 10 or greater and 500 or less.

11. The terahertz wave detecting device according to claim 1, wherein
a sheet resistance of the material of the terahertz wave absorption layer is 300Ω/square or less and 50Ω/square or greater, and
a film thickness of the terahertz wave absorption layer is 1 nm or greater and 500 nm or less.

12. The terahertz wave detecting device according to claim 1, wherein
the terahertz wave absorption layer is made of a metal alloy material.

13. The terahertz wave detecting device according to claim 1, wherein
the terahertz wave absorption layer is made of a silicon compound.

14. The terahertz wave detecting device according to claim 1, wherein
the terahertz wave absorption layer is made of a nitrogen compound.

15. An imaging device comprising:
a terahertz wave generating device configured to generate terahertz waves;
a terahertz wave detecting device configured to detect the terahertz waves that were emitted from the terahertz wave generating device and transmitted through an object or reflected by the object; and
an image generating unit configured to generate an image of the object based on detection results of the terahertz wave detecting device,
the terahertz wave detecting device including
a wavelength filter configured to convert the terahertz waves that were transmitted through the object or reflected by the object to heat, and
a detection part configured to detect the heat converted by the wavelength filter,
the wavelength filter of the terahertz wave detecting device including
a wavelength selection layer configured to transmit terahertz waves of a prescribed wavelength among the terahertz waves that were transmitted through the object or reflected by the object, and
a terahertz wave absorption layer provided in contact with the wavelength selection layer and the detection part, and containing a material for absorbing the terahertz waves of the prescribed wavelength.

16. The imaging device according to claim 15, wherein
a dielectric constant of the material of the terahertz wave absorption layer is 10 or greater and 500 or less.

17. The imaging device according to claim 15, wherein
a sheet resistance of the material of the terahertz wave absorption layer is 300Ω/square or less and 50Ω/square or greater, and
a film thickness of the terahertz wave absorption layer is 1 nm or greater and 500 nm or less.

18. A measuring device comprising:
a terahertz wave generating device configured to generating terahertz waves;
a terahertz wave detecting device configured to detect the terahertz waves that were emitted from the terahertz wave generating device and transmitted through an object or reflected by the object; and
a measuring unit configured to measure the object based on detection results of the terahertz wave detecting device,
the terahertz wave detecting device including
a wavelength filter configured to convert the terahertz waves that were transmitted through the object or reflected by the object to heat, and
a detection part configured to detect the heat converted by the wavelength filter,
the wavelength filter of the terahertz wave detecting device including
a wavelength selection layer configured to transmit terahertz waves of a prescribed wavelength among the terahertz waves that were transmitted through the object or reflected by the object, and
a terahertz wave absorption layer provided in contact with the wavelength selection layer and the detection part, and containing a material for absorbing the terahertz waves of the prescribed wavelength.

19. The measuring device according to claim 18, wherein a dielectric constant of the material of the terahertz wave absorption layer is 10 or greater and 500 or less.

20. The measuring device according to claim 18, wherein a sheet resistance of the material of the terahertz wave absorption layer is 300Ω/square or less and 50Ω/square or greater, and a film thickness of the terahertz wave absorption layer is 1 μm or greater and 500 nm or less.

* * * * *